United States Patent [19]
Mchenry et al.

[11] Patent Number: 5,186,833
[45] Date of Patent: Feb. 16, 1993

[54] COMPOSITE METAL-CERAMIC MEMBRANES AND THEIR FABRICATION

[75] Inventors: James A. Mchenry, Washington; Harry W. Deckman, Clinton; Wen-Yih F. Lai, Fair Lawn; Michael G. Matturro, Lambertville, all of N.J.; Allan J. Jacobson, Houston, Tex.; Jack W. Johnson, Clinton, N.J.

[73] Assignee: Exxon Research and Engineering Company, Florham Park, N.J.

[21] Appl. No.: 775,656

[22] Filed: Oct. 10, 1991

[51] Int. Cl.$^5$ .............................................. B01D 61/18
[52] U.S. Cl. ........................ 210/321.75; 210/321.84; 210/500.25; 210/500.26; 264/45.1
[58] Field of Search .............. 210/321.89, 321.75, 210/321.84, 500.25, 500.26; 264/45.1, DIG. 48, DIG. 62

[56] References Cited
U.S. PATENT DOCUMENTS 5,066,398  11/1991  Soria et al. ................ 210/321.89

OTHER PUBLICATIONS

R. J. Vuren et al., "High Tech Ceramics", Elsevier Science Publishers, pp. 2235–2245 (1987).
A. F. M. Leenaars et al., "Chemtech", vol. 16, No. 9, pp. 560–564 (1986).
Leenaars et al., "Journal of membrane Science", 24, pp. 245–260 (1985).
Leenaars et al., "Journal of Colloid and Interface Science", vol. 105, No. 1, pp. 27–40 (1985).
Leenaars et al., "Journal of Materials Science", 19, pp. 1077–1088 (1984).
Burggraaf et al., "Solid State Ionics", 32/33, pp. 771–782 (1989).
Keizer et al., "Sci. Ceram.", vol. 14, pp. 83–93 (1988).

Primary Examiner—Frank Sever
Attorney, Agent, or Firm—Joseph J. Dvorak

[57] ABSTRACT

The present invention provides a novel, porous, composite membrane comprising a metallic support having large pores and a microporous ceramic membrane deposited on the support and integral therewith. Preferably, the support is steel having pores in the range of from about 0.25 μm to about 50 μm and the ceramic membrane is alumina having pores ranging from about 5 Å to about 2500 Å.

14 Claims, 4 Drawing Sheets

5,186,833

COMPOSITE METAL-CERAMIC MEMBRANES AND THEIR FABRICATION

FIELD OF THE INVENTION

The present invention relates to membranes useful in microfiltration and ultrafiltration processes. More particularly, the present invention is concerned with a novel composite membrane.

BACKGROUND

Membranes containing physical pores have been used in a variety of separations such as filtration, microfiltration, ultrafiltration, and reverse osmosis. The size of the pore structure in the membrane is an important factor in determining the type of separation in which the membrane can be used. Membranes with pore sizes greater than about 10 $\mu$m are generally used for filtration, while microfiltration utilizes membranes with pore sizes in the range of 10 $\mu$m to 0.1 $\mu$m and ultrafiltration utilizes membranes with pore sizes less than about 0.1 $\mu$m.

To maximize flux through microfiltration and ultrafiltration membranes, it is advantageous to make the layer containing the small (less than about 0.25 $\mu$m) pores as thin as possible. One way of achieving this is to construct an asymmetric membrane structure in which a small pore layer is composited with layers having larger pores. The small pore layer is the active micro or ultrafiltration membrane, while the larger pore layer or layers provide mechanical strength without significantly reducing the flux through the membrane.

Asymmetric membrane structures are routinely made from polymeric materials. By controlling the casting and drying conditions, it is possible to obtain a thin, small pore layer on one side of a sheet which has large pores. Polymeric asymmetric membranes have been extensively used in ultrafiltration applications; however, polymeric membranes can only be used in low temperature (<150° C.) applications because of their thermal unstability and they cannot be cleaned with strong acids, bases and oxidizing agents once they have been fouled because of their chemical reactivity.

To overcome these limitations, some researchers have been experimenting with asymmetric membrane structures made entirely from ceramic materials. These asymmetric inorganic membrane structures have several attractive features including: (1) high temperature stability, (2) an ultrafine pore structure in the asymmetric layer which can be fabricated in sizes ranging from about 5 Å to 2500 Å, and (3) relatively high permeabilities due to the thinness of the asymmetric layer. Currently, modules made using these membranes have not been extensively utilized in industrial processes because of the relatively high cost per unit active area and because of issues associated with the possibility of catastrophic failure of the ceramic elements.

The present invention seeks to provide structurally sound micro and ultrafiltration membranes. Another object of the present invention is to provide a new thermally and chemically stable membrane structure.

SUMMARY OF THE INVENTION

Accordingly, the present invention provides a novel, porous, composite membrane comprising a metallic support having large pores and a microporous ceramic membrane deposited on the support and integral therewith. Preferably, the support is steel having pores, i.e., pore diameters, in the range of from about 0.25 $\mu$m to about 50 $\mu$m and the ceramic membrane is alumina having pores ranging from about 5 Å to about 2500 Å.

In another embodiment of the present invention, there is provided a method for forming a metal-ceramic composite membrane structure comprising: providing a metal support having large pores therein, the support having a first surface and a second surface; forming a ceramic gel on the first surface of the support; and thereafter calcining the ceramic gel at a temperature and for a time sufficient to form a microporous ceramic layer which is integral with the support, whereby a component metal-ceramic membrane is formed.

DESCRIPTION OF PREFERRED EMBODIMENT

The composite metal-ceramic membrane of the present invention has a large pore metal layer and a small pore ceramic layer. The metal layer, which acts as a high permeability mechanical support for the ceramic layer, has pores with sizes greater than about 0.25 $\mu$m and less than about 50 $\mu$m. In a preferred embodiment, pores of the metal layer are in the range between 0.25 $\mu$m and 5 $\mu$m. Among the metals suitable as porous supports are stainless steel and other iron alloys, titanium, nickel, silver and copper. Particularly preferred is porous stainless steel which is commercially available in a variety of pore sizes ranging from 0.2 to 10 microns.

A small pore ceramic layer is formed directly on the metal layer and has pores in the range between about 5 Å and about 2500 Å. Among the ceramic materials suitable for use in the composite membrane are alumina, zirconia, titania, silica, ceria and mixtures thereof. Alumina is preferred.

To maximize flux and thermal stability of the composite membrane, the thickness of the ceramic layer should be less than about 50 $\mu$m. To avoid problems with pinholes, the thickness of the ceramic layer should be significantly greater than about 0.01 $\mu$m. In a preferred embodiment, the thickness of the ceramic layer is less than 10 $\mu$m and greater than 0.1 $\mu$m.

The large pore metal layer provides mechanical support for the fine pore ceramic layer. To provide adequate mechanical stability, the metal layer should be thicker than the ceramic layer, but not so thick so as to hinder transport through the composite membrane. This requirement can be met with porous metal layers thicker than about 5 $\mu$m and thinner than about 5 cm. In a preferred embodiment, the metal is thicker than 25 $\mu$m and thinner than 1 mm.

The metal-ceramic membrane of the present invention is prepared by forming the ceramic membrane directly on one surface of the metal support. This is conveniently achieved by depositing a ceramic sol on one surface of the support, converting the sol to a gel, and then calcining the gel at a temperature and for a time sufficient to form the microporous ceramic layer.

Two different techniques will be described in detail illustrating the foregoing preparative procedure. For convenience, the ceramic layer will be alumina and the metal layer will be stainless steel; however, it will be appreciated that the techniques are applicable to other ceramics and metal support layers.

Figure 1:
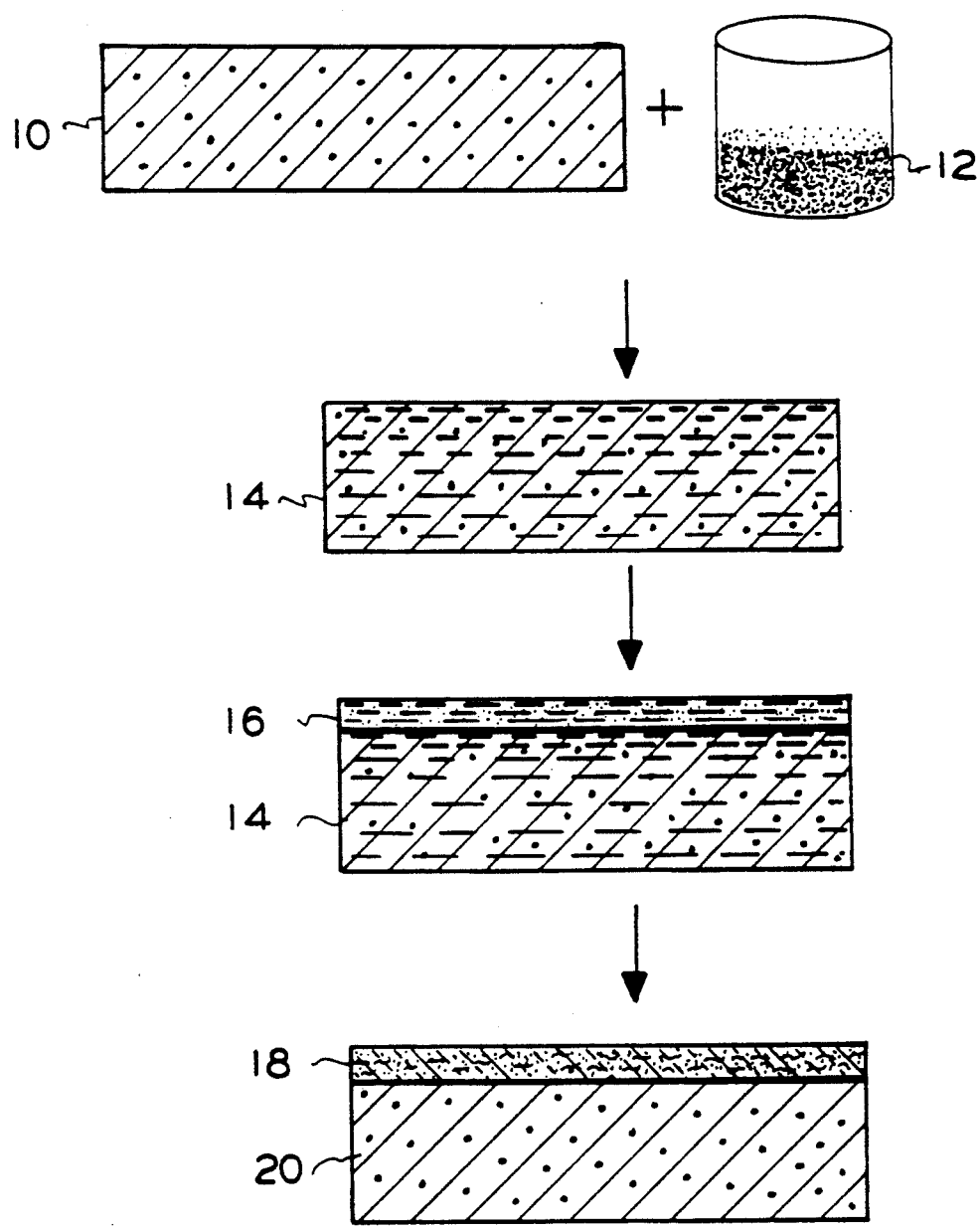
FIG. 1 is a schematic drawing illustrating the principle steps involved in the fabrication of a composite ceramic/metal membrane of the invention using an interfacial gelation technique.

The first technique uses pH induced surface gelation of a boehmite sol to form an alumina membrane on a porous stainless steel metal support. As shown in FIG. 1, a viscous liquid base 12 is added to a porous stainless steel support 10. The viscous base 12 floods the pore structure of support 10 resulting in structure 14. In flooding the metal support 10, the base 12 forms a film over at least some of the internal pore structure as well as the exterior surface of the membrane. Thus, the base must have a viscosity sufficient to produce that effect. Additionally, the base must be capable of inducing gelation of the sol. Examples of such bases are hydroxides such as ammonium hydroxide, organoammonium hydroxides like tetraalkyl, aryl and aralkyl ammonium hydroxides. After flooding the support with base, a boehmite sol is then coated as a thin film 16 over the exterior surface of the base flooded structure 14. Contact with the base coated metal structure 14 induces gelation of the boehmite sol. Optionally, a surfactant may be added to the sol in amounts sufficient to prevent or inhibit cracking of the sol on drying and calcining. Typically, from about 0.01 to about 0.1 wt. % of surfactant is useful. Also, optionally, a slight vacuum is then applied to the uncoated side of the sol coated structure to improve adhesion of the interfacially formed layer 16. The porous alumina layer 18 is formed by successively drying and calcining the interfacially gelled sol. The calcining is performed with a carefully controlled time/temperature cycle which determines the ultimate pore structure in the alumina layer 18. Typically, the sol coated substrate is heated from ambient temperature to an end temperature in the range of from about 300° C. to about 1000° C. at a heating rate of from about 5° C. to about 100° C. per hour and, preferably, from about 10° C. to about 20° C. per hour. Optionally, the heated calcined composite is heat soaked at the selected end temperature for about 6 to about 48 hours.

After calcining, the porous ceramic layer 18 is well adhered to the surface of the porous metal 20. The composite structure consisting of a porous ceramic layer 18 and the porous metal 20 form the composite metal/ceramic membrane structure.

Figure 2:
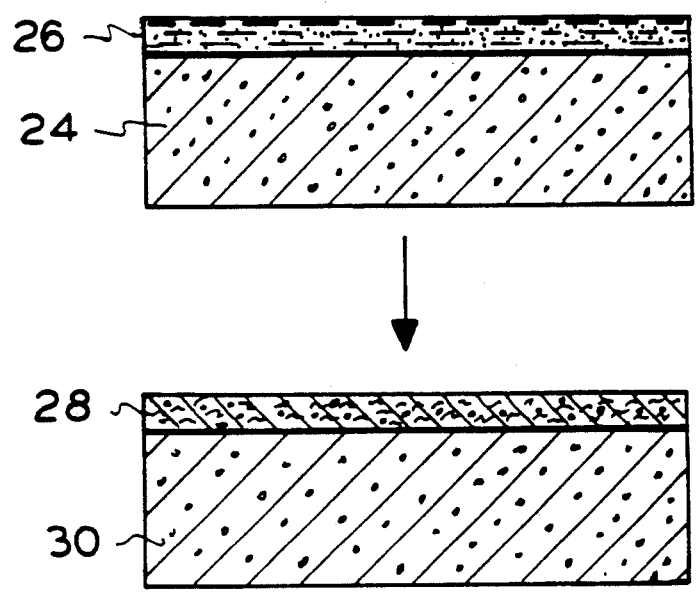
FIG. 2 is a schematic diagram illustrating the principle steps involved in the fabrication of a composite ceramic/metal membrane of the invention using a viscous surface coating technique.

As is shown in FIG. 2, a boehmite sol 26 is coated on the surface of metal support 24. Depending upon the viscosity of the sol and the pore size of the metal support, coating of the metal support 24 by the sol 26 without significant invasion of the bulk of the metal pores can be achieved. For example, a sol having a viscosity of from about 2 to about 10 centistokes can be readily coated on the surface of a metal support having a pore size less than about 2 μm. For porous metals with pore sizes greater than about 2 μm, the viscosity of the sol has to be increased to prevent it from invading the bulk of the metal pore structure. To increase the viscosity of the sol, a thickener such as a polymer is added to the sol in an amount sufficient to increase the viscosity of the sol to greater than 10 centistokes, and in a preferred embodiment, the amount of polymer added to the sol is sufficient to increase the viscosity of the resulting sol to more than 50 centistokes. Typical polymers include starch and water soluble polymers such as methylcellulose and polyvinyl-alcohol. To prevent cracks from forming during the curing of the deposited sol layer, it is often advantageous to add a nonionic surfactant to the polymer+sol mixture. Typical surfactants useful include nonionic surfactants such as alkylphenyl polyether alcohols and cationic surfactants such as sodium lauryl sulfate. After coating the metal support 24 with the sol 26, the sol is air dried, thereby forming a ceramic gel. The gel is then calcined using a carefully controlled time-temperate cycle, as previously described in connection with the first technique.

After thermal processing, a porous ceramic layer 28 is well adhered to the porous metal 30 and the overall structure forms the composite membrane.

Several uses exist for composite porous ceramic/metal membranes. The pore size of the membranes makes them suited to microfiltration and ultrafiltration applications. Because they are chemically inert to many reagents, they can be chemically cleaned if they foul. For example, they are inert to strong peroxide and bleach solutions which cannot be used to clean fouled polymeric membranes. Their thermal stability makes them suited for a variety of high temperature filtration applications which cannot be addressed with polymer membranes.

EXAMPLE 1

A composite alumina/steel membrane was formed by pH induced surface gelation. The porous steel used was formed into a 2 mm thick sheet with a porosity of about 40% and an average pore size near 6 μm. To gel the alumina sol and create the composite membrane, the steel was first flooded with benzyltrimethyl ammonium hydroxide. Benzyltrimethyl ammonium hydroxide is an oily base and was coated into the porous stainless steel to guarantee that the ceramic layer (created in later steps) forms only on the surface. The benzyltrimethyl ammonium hydroxide was coated so that it forms a thin film covering the pore structure. Typically, the benzyltrimethyl ammonium hydroxide is coated by flowing a 25% solution of the base in methanol through the porous steel sheet. When the alcohol evaporates, a thin film of benzyltrimethyl ammonium is left coating the pore structure.

A boehmite sol was rapidly flooded over the base coated porous steel sheet. After about 20 seconds, excess sol was drained off, leaving a gel coating on one surface of the porous metal sheet. Boehmite is an alumina sol which is readily gelled by contact with base and the base in the metal pore structure caused the sol to gel near the surface of the porous metal sheet. Concentration of the boehmite sol flooded onto the porous metal surface was 10%. In general, the concentration of the boehmite sol should be in the 25 mole % or less regime. Higher concentrations produce thick coatings which tend to crack. To prevent cracking and improve the resulting membrane quality, a nonionic surfactant, Triton 100, was added to the sol before it was applied to the porous sheet. Ten drops of the surfactant were added to about 100 ml of the sol. Triton 100 is the trade name for one of a series of nonionic alkylphenyl polyether alcohols sold by Rhom and Haas Company, Philadelphia, Pa.

After the gel coating was formed and excess sol removed, a slight vacuum (about 100 torr) was applied to the uncoated side of the porous steel sheet. The vacuum pulled the viscous gel coating into the metal pore mouths, improving adhesion of the final coating. Because of the high viscosity of the gel layer, it is only pulled a short distance (less than about 1 μm) into the pore structure.

The gel coating on the porous steel was air dried before it was fired to produce the final ceramic layer. Slowly drying the gel coating in a high humidity atmosphere tends to produce crack free films after the final thermal curing cycle. The air dried sol-gel layer can be cured into a hard porous ceramic coating by air firing using a carefully controlled time-temperature cycle. To obtain a ceramic layer, air dried sols were heated in an oven with the temperature increasing at the rate of 10° C./hr. to a maximum temperature of about 400° C. The resulting pore distribution in the ceramic layer was characterized using gas adsorption measurements. Results obtained from one of these measurements are summarized in FIG. 3. It is seen that most of the pores have dimensions below 50 Å, which was consistent with the curing cycle used to prepare the ceramic layer. Measurements of the B.E.T. surface area (401.8 m$^2$/gm) confirmed expectations that the ceramic layer is extremely porous. The pore size produced in the thermal curing cycle depends on the maximum firing temperature and the rate at which the temperature is increased. By varying the rate at which the temperature is ramped and the final firing temperature, it is possible to produce narrow pore distributions with sizes from about 30–1,000 Å.

EXAMPLE 2

A composite alumina/steel membrane was formed by dip coating a solution containing boehmite and water soluble polymer. The porous steel sheet was identical to that used in Example 1. The water soluble polymer was used to increase the viscosity of the boehmite sol. The polymer used was a commercially available material, methylcellulose. By making solutions containing 1-5% of this polymer, the viscosity of the sol can be increased to the point that it does not invade the interior of the porous metal support containing pores in the size range between 1 and 15 μm. In this example, a solution containing about 10% boehmite, about 1% methylcellulose and 0.05% of the nonionic surfactant Triton 100 (described in Example 1) was used. The nonionic surfactant was added to the polymer and sol solution to improve the quality of the final ceramic film. Improvement of the coating quality comes mainly from the tendency of nonionic surfactant to reduce cracking in the final coating.

Figure 3:
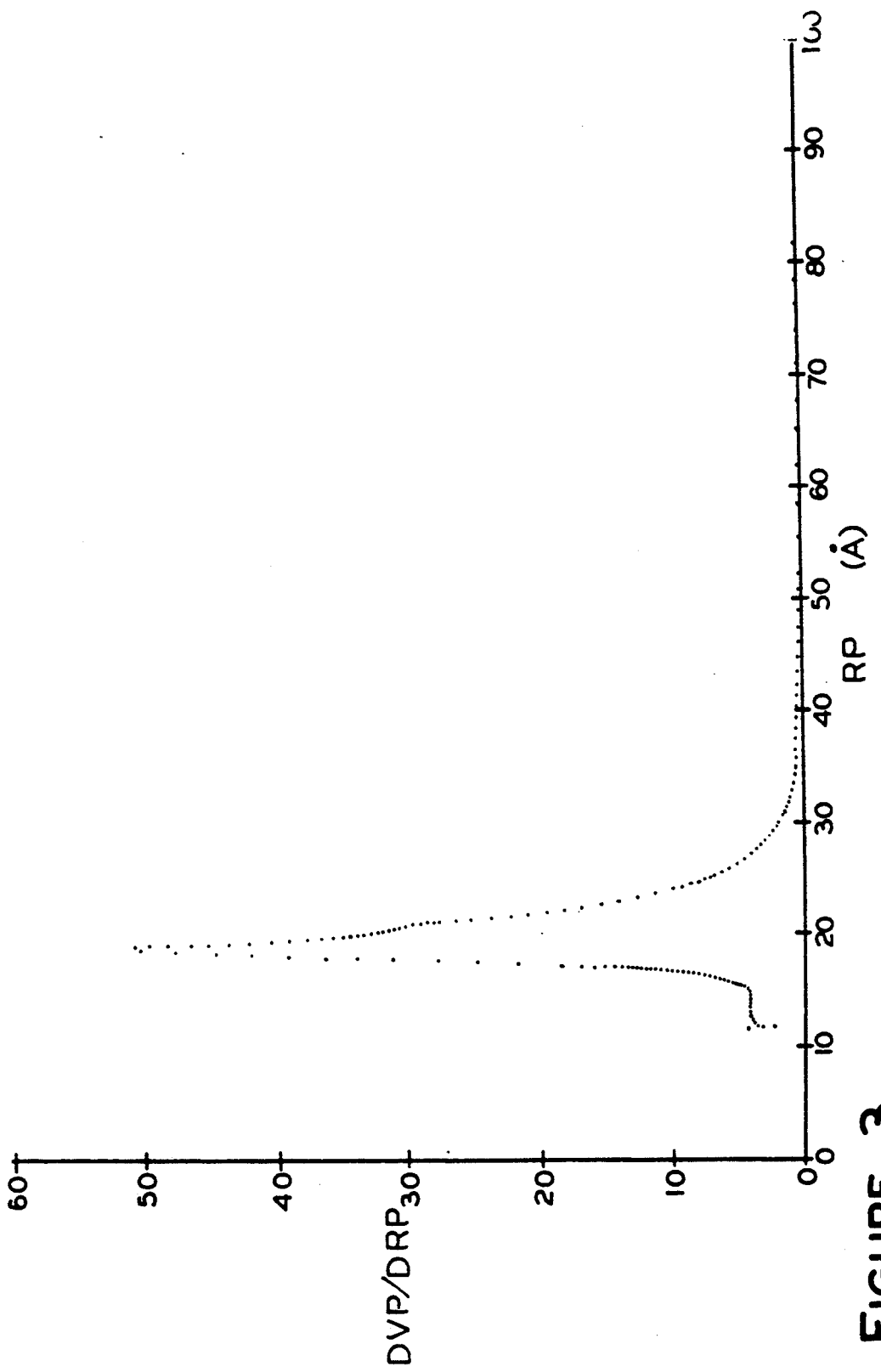
FIGS. 3 and 4 are graphs showing the pore size distribution of membranes prepared in Examples 1 and 2, respectively. In the figures, DVP/DRP is the incremental increase in pores per incremental increase in pore radius and RP is the radius of the pores in Angstroms.
Figure 4:
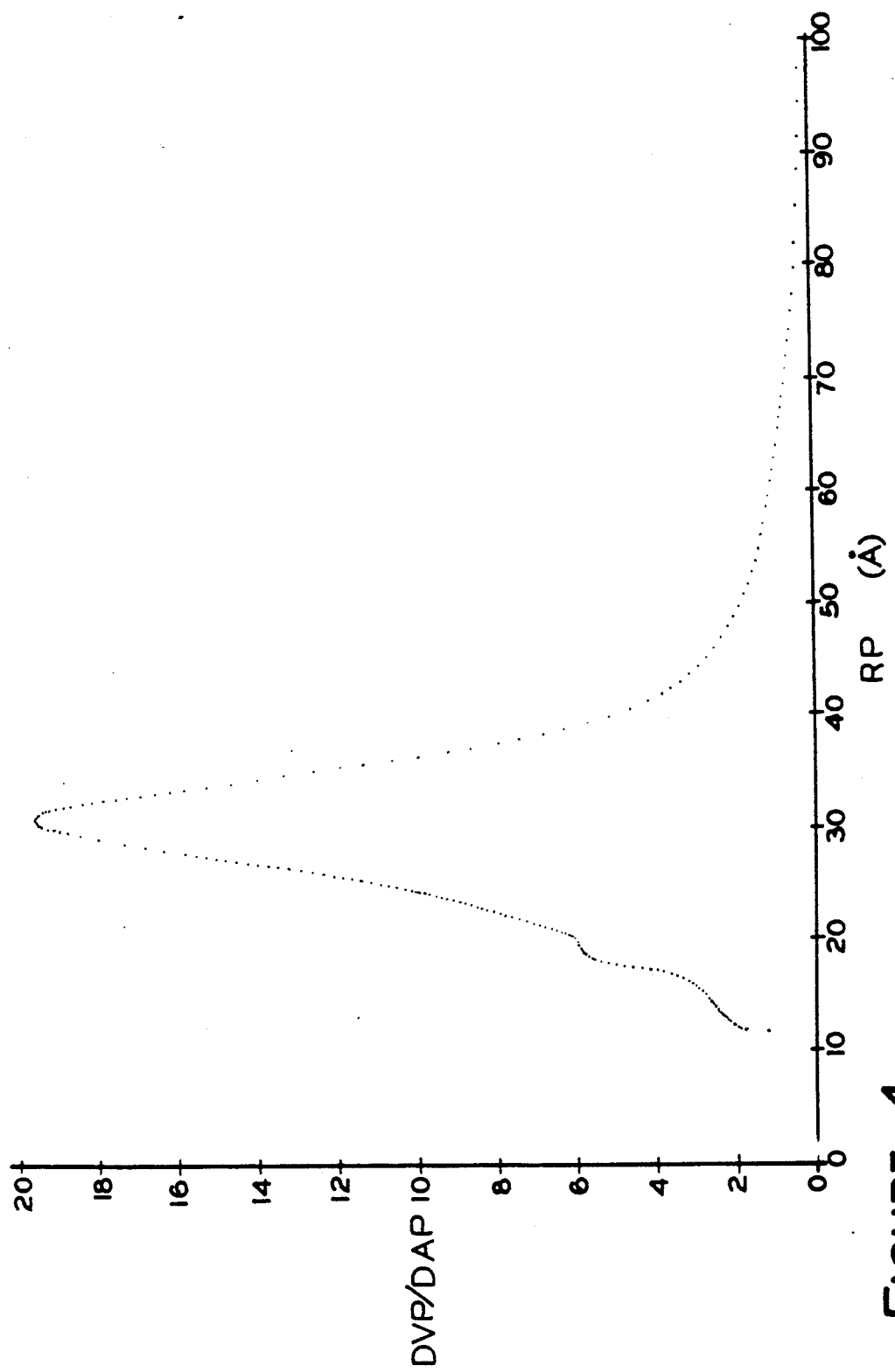

Dip coating of a solution containing about 10% boehmite sol, 1% polymer and 0.05% nonionic surfactant produced a 25 μm thick layer on the surface of the porous steel sheet. This layer has considerably thicker coatings formed by interfacial pH induced gelation. The coating was allowed to air dry for two days before it was thermally cured. Thermal curing of the coating with the temperature increasing at the rate of 10° C./hr. to a maximum temperature of 400° C. produced a well adhered ceramic layer with the pore size distribution shown in FIG. 4. It should be noted that this pore distribution is somewhat different from that shown in FIG. 3, even though the same thermal curing cycle was used in each case. Differences in the pore size distributions between FIGS. 3 and 4 are due to differences in the way the coatings were prepared.

We claim:

1. A composite membrane consisting essentially of a porous metal support having a first surface and a second surface; and a microporous ceramic layer deposited on this support.

2. The composite of claim 1 wherein the support has pores in the range of from about 0.25 μm to about 50 μm and the ceramic layer has micropores in the range of from about 5 Å to about 2500 Å.

3. The composite of claim 2 wherein the ceramic layer has a thickness less than about 50 μm.

4. The composite of claim 3 wherein the ceramic layer has a thickness greater than about 0.01 μm.

5. The composite membrane of claim 4 wherein the metal support is porous stainless steel.

6. The composite of claim 5 wherein the ceramic layer is alumina.

7. A method comprising: forming a metal ceramic composite membrane structure consisting essentially of a porous metal support having a first surface and a second surface and a microporous ceramic layer deposited on this support, by, providing a metal support having large pores therein, the support having a first surface and a second surface;

forming a ceramic gel on the first surface of the support; and thereafter calcining the ceramic gel at a temperature and for a time sufficient to form a microporous ceramic layer which is integral with the support.

8. The method of claim 7 wherein the gel is calcined by heating at a rate of from about 5° C. to about 100° C. per hour to an end temperature in the range of from about 300° C. to about 1000° C.

9. The method of claim 8 wherein the rate is from about 10° C. to about 20° C. per hour.

10. The method of claim 8 wherein a ceramic gel is formed on the first surface of the support by: first flooding the support with a viscous base in an amount sufficient to substantially fill the pores of the support and to coat the first surface of the support and then depositing a sol over the base coated on the support whereby gelation of the sol induced, whereby a ceramic gel is formed on the surface of the support.

11. The method of either one of claims 10 and 13 including adding a surfactant to the sol prior to depositing the sol on the support.

12. The method of claim 11 wherein the amount of surfactant added ranges from about 0.01 wt. % to about 0.1 wt. %.

13. The method of claim 8 wherein a ceramic gel is formed by depositing a sol on the first surface of the support, and drying the deposited sol, thereby forming a ceramic gel.

14. The method of claim 11 including adding a thickener to the sol in an amount sufficient to increase the viscosity of the sol to prevent the sol from invading the bulk of the pores of the metal support.

* * * * *